（12）United States Patent
Huang (10) Patent No.: US 10,509,490 B2
(45) Date of Patent: Dec. 17, 2019

(54) TOUCH MODULE AND ELECTRONIC COMPUTING DEVICE WITH SAME (71) Applicant: Primax Electronics Ltd., Taipei (TW)

(72) Inventor: Tai-Sou Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 22 days.

(21) Appl. No.: 15/962,055

(22) Filed: Apr. 25, 2018

(65) Prior Publication Data

US 2019/0243475 A1    Aug. 8, 2019

(30) Foreign Application Priority Data

Feb. 2, 2018    (TW) ............................... 107103864 A (51) Int. Cl.
*G06F 3/0354* (2013.01)
*G06F 1/16* (2006.01)
*G06F 3/041* (2006.01)

(52) U.S. Cl.
CPC ........ *G06F 3/03547* (2013.01); *G06F 1/1628* (2013.01); *G06F 1/1681* (2013.01); *G06F 3/0416* (2013.01)

(58) Field of Classification Search
CPC combination set(s) only.
See application file for complete search history.

(56) References Cited

U.S. PATENT DOCUMENTS

| 8,890,824 | B2* | 11/2014 | Guard | G06F 3/044 |
| | | | | 345/173 |
| 8,982,062 | B2* | 3/2015 | Bos | G06F 3/03547 |
| | | | | 345/173 |
| 9,069,394 | B2* | 6/2015 | Clayton | G06F 3/03547 |
| 9,490,088 | B2* | 11/2016 | Kagayama | G06F 3/016 |
| 9,542,016 | B2* | 1/2017 | Armstrong-Muntner | |
| | | | | G06F 3/042 |
| 2006/0250377 | A1* | 11/2006 | Zadesky | G06F 1/1613 |
| | | | | 345/173 |
| 2011/0242075 | A1* | 10/2011 | Yamamoto | G06F 3/0412 |
| | | | | 345/207 |
| 2013/0021295 | A1* | 1/2013 | Kimura | G02F 1/13338 |
| | | | | 345/174 |

* cited by examiner

*Primary Examiner* — Deeprose Subedi
(74) *Attorney, Agent, or Firm* — Kirton McConkie; Evan R. Witt (57) ABSTRACT

A touch module includes an upper plate, a lower plate, a hinge structure, an elastomer and a touchpad assembly. The touchpad assembly is located over the upper plate. A first end of the upper plate and a first end of the lower plate are pivotally coupled to each other through the hinge structure. While the touchpad assembly is pressed down, a second end of the upper plate is swung downwardly relative to a second end of the lower plate and a switch element of the touchpad assembly is triggered. When the touchpad assembly is no longer pressed, the elastomer provides an elastic force to the upper plate. In response to the elastic force, the second end of the upper plate is swung upwardly relative to the second end of the lower plate and the touchpad assembly is returned to an original position.

18 Claims, 10 Drawing Sheets

TOUCH MODULE AND ELECTRONIC COMPUTING DEVICE WITH SAME

FIELD OF THE INVENTION

The present invention relates to the field of an input device, and a touch module with a touch control function and an electronic computing device with the touch module.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The widely-used electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling operations of the electronic device.

Figure 1:
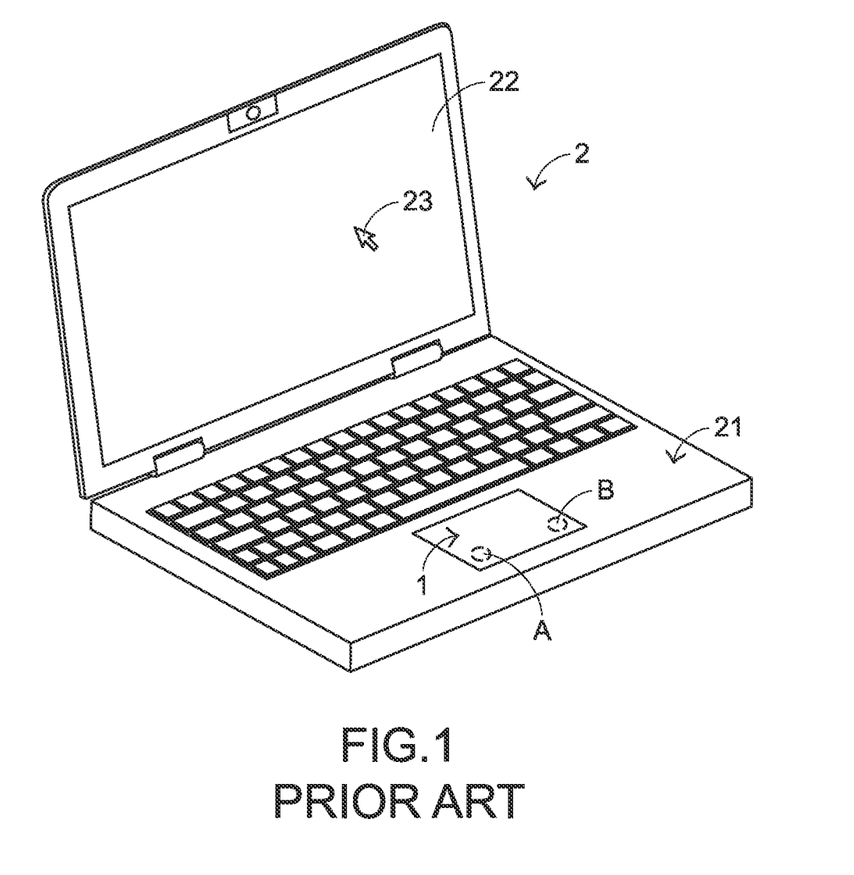
FIG. 1 schematically illustrates a conventional notebook computer with a touchpad assembly.

FIG. 1 schematically illustrates a conventional notebook computer with a touchpad assembly. As shown in FIG. 1, the touchpad assembly 1 is installed on a casing 21 of the notebook computer 2. Moreover, at least a portion of the touchpad assembly 1 is exposed outside so as to be touched by the user's finger. Consequently, the user may operate the touchpad assembly 1 to control the notebook computer 2. For example, in case that the user's finger is placed on the touchpad assembly 1 and slid on the touchpad assembly 1, a cursor 23 shown on a display screen 22 of the notebook computer 2 is correspondingly moved. Moreover, in case that the touchpad assembly 1 is pressed down by the user's finger, the notebook computer 2 executes a specified function. The use of the touchpad assembly 1 can implement some functions in replace of the conventional mouse. In other words, the user may operate the notebook computer 2 through the touchpad assembly 1 without the need of additionally carrying or installing the mouse.

Figure 2:
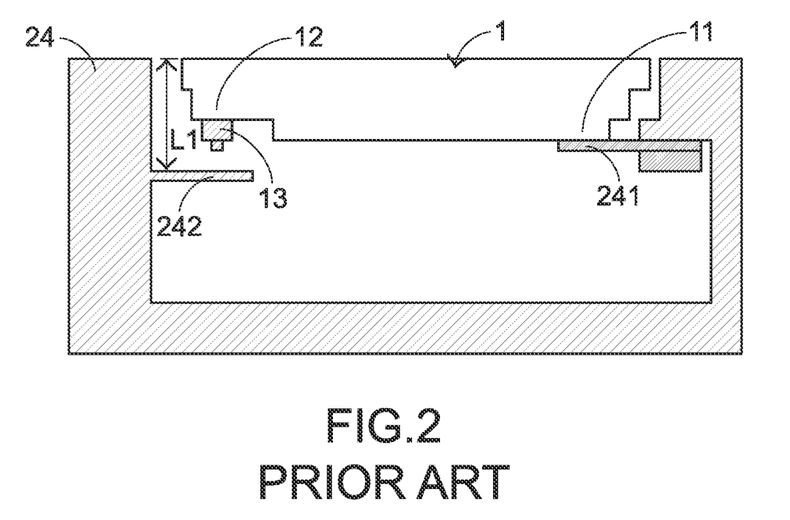
FIG. 2 is a schematic cross-sectional view illustrating the touchpad assembly as shown in FIG. 1, in which the touchpad assembly is not pressed down.
Figure 3:
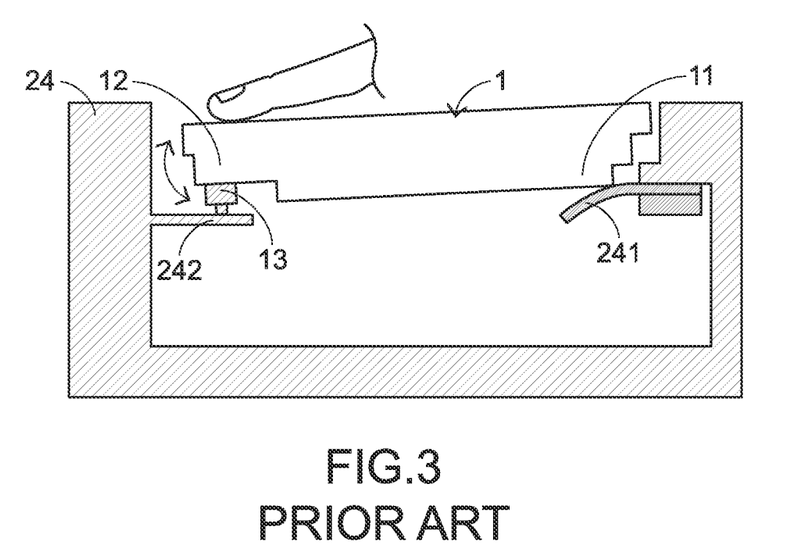
FIG. 3 is a schematic cross-sectional view illustrating the touchpad assembly as shown in FIG. 1, in which the touchpad assembly is pressed down.

FIG. 2 is a schematic cross-sectional view illustrating the touchpad assembly as shown in FIG. 1, in which the touchpad assembly is not pressed down. FIG. 3 is a schematic cross-sectional view illustrating the touchpad assembly as shown in FIG. 1, in which the touchpad assembly is pressed down. As shown in FIGS. 2 and 3, a fixing frame 24 is concavely formed in the casing 21 of the notebook computer 2. A flexible structure 241 and a contacting part 242 are respectively protruded from two opposite sides of an inner wall of the fixing frame 24. A first end 11 of the touchpad assembly 1 is connected with the flexible structure 241. Consequently, a second end 12 of the touchpad assembly 1 may be swung relative to the contacting part 242 by using the flexible structure 241 as a fulcrum. Moreover, the touchpad assembly 1 further comprises a switch element 13. The switch element 13 is located under the second end 12 of the touchpad assembly 1 and aligned with the contacting part 242.

While the touchpad assembly 1 is pressed down by the user, the second end 12 of the touchpad assembly 1 is swung downwardly relative to the contacting part 242 by using the flexible structure 241 as a fulcrum. When the switch element 13 of the touchpad assembly 1 is pushed by the contacting part 242 of the fixing frame 24, the switch element is triggered. Consequently, a command signal is issued to the notebook computer 2. When the touchpad assembly 1 is no longer pressed down by the user, the second end 12 of the touchpad assembly 1 is swung upwardly relative to the contacting part 242 in response to the elastic force of the switch element 13 and the elastic force of the flexible structure 241. Consequently, the touchpad assembly 1 is returned to its original position.

However, the conventional touchpad assembly 1 still has some drawbacks. For example, when the touchpad assembly 1 is not pressed down (i.e., in an initial status), a distance L1 between the second end 12 of the touchpad assembly 1 and the contacting part 242 cannot be kept constant easily. Consequently, when the touchpad assembly 1 is not pressed down (i.e., in the initial status), the touchpad assembly 1 is readily ascended above the fixing frame 24 or descended below the fixing frame 24 or even the touchpad assembly 1 is inclined and not in the horizontal status.

For solving the above drawbacks, it is necessary to additionally install a positioning element (not shown) on the fixing frame 24 and the touchpad assembly 1 so as to position the touchpad assembly 1. For example, the technologies of additionally installing the positioning element are disclosed in U.S. Pat. Nos. 6,118,345 and 8,441,450. Since the additional positioning element increases the process complexities of the notebook computer 2 and the touchpad assembly 1, the difficulty of installing the touchpad assembly 1 on the notebook computer 2 also increases. Therefore, it is important to improve the convenience of installing the touchpad assembly 1 on the notebook computer 2 and increase the positioning reliability of the touchpad assembly 1.

Please refer to FIG. 1 again. As shown in FIG. 1, a region A and a region B are respectively located at two corners of the second end 12 of the touchpad assembly 1. Consequently, an additional drawback of the touchpad assembly 1 occurs. Take the notebook computer 2 and the structure of the touchpad assembly 1 for example. When one of the region A and the region B is pressed down, the difference between the downward displacement of the region A and the downward displacement of the region B is very large. The user prefers that the downward displacement of the region A and the downward displacement of the region B are substantially equal when one of the region A and the region B is pressed down.

In other words, the conventional touchpad assembly and the electronic computing device with the touchpad assembly need to be further improved.

SUMMARY OF THE INVENTION

An object of the present invention provides a modularized touch module with enhanced assembling convenience and positioning reliability.

Another object of the present invention provides an electronic computing device with the touch module.

In accordance with an aspect of the present invention, there is provided a touch module. The touch module includes an upper plate, a lower plate, a hinge structure, an elastomer and a touchpad assembly. The lower plate is separately located under the upper plate. The hinge structure is arranged between a first end of the upper plate and a first end of the lower plate. The first end of the upper plate and the first end of the lower plate are pivotally coupled to each other through the hinge structure. Consequently, a second end of the upper plate is permitted to be swung relative to a second end of the lower plate. The elastomer is arranged between the upper plate and the lower plate. The touchpad assembly is located over the upper plate. A switch element is located under the touchpad assembly and aligned with the second end of the lower plate. While the touchpad assembly is pressed down and the upper plate is moved with the touchpad assembly, the second end of the upper plate is swung downwardly relative to the second end of the lower plate and the switch element is triggered. When the touchpad assembly is no longer pressed, the elastomer provides an elastic force to the upper plate. In response to the elastic force, the second end of the upper plate is swung upwardly relative to the second end of the lower plate and the touchpad assembly is returned to an original position.

In accordance with another aspect of the present invention, there is provided an electronic computing device. The electronic computing device includes a casing, a processor and a touch module. A fixing frame is concavely formed in the casing. The processor is disposed within the casing. The touch module is disposed within the fixing frame and electrically connected with the processor. The touch module includes an upper plate, a lower plate, a hinge structure, an elastomer and a touchpad assembly. The lower plate is separately located under the upper plate. The hinge structure is arranged between a first end of the upper plate and a first end of the lower plate. The first end of the upper plate and the first end of the lower plate are pivotally coupled to each other through the hinge structure. Consequently, a second end of the upper plate is permitted to be swung relative to a second end of the lower plate. The elastomer is arranged between the upper plate and the lower plate. The touchpad assembly is located over the upper plate. A switch element is located under the touchpad assembly and aligned with the second end of the lower plate. While the touchpad assembly is pressed down and the upper plate is moved with the touchpad assembly, the second end of the upper plate is swung downwardly relative to the second end of the lower plate and the switch element is triggered. When the touchpad assembly is no longer pressed, the elastomer provides an elastic force to the upper plate. In response to the elastic force, the second end of the upper plate is swung upwardly relative to the second end of the lower plate and the touchpad assembly is returned to an original position.

From the above descriptions, the touch module of the present invention is a modularized device. It is not necessary to install associated restoring components in the fixing frame of the electronic computing device to return the touchpad assembly after the touchpad assembly is no longer pressed down. Moreover, it is not necessary to install associated positioning element in the fixing frame of the electronic computing device to prevent the touchpad assembly from being ascended above the fixing frame or descended below the fixing frame or prevent the touchpad assembly from being inclined (or in the non-horizontal status). During the process of assembling the touch module with the electronic computing device, only the following steps are needed. That is, the depth of the coupling junction between the positioning element and the upper plate positioning part of the touch module is adjusted, and the control module is placed into and electrically connected with the fixing frame of the casing of the positioning element. Consequently, the installing convenience and the positioning reliability of the touchpad assembly are largely enhanced. In other words, the touch module and the electronic computing device of the present invention can overcome the drawbacks of the conventional technologies.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 4:
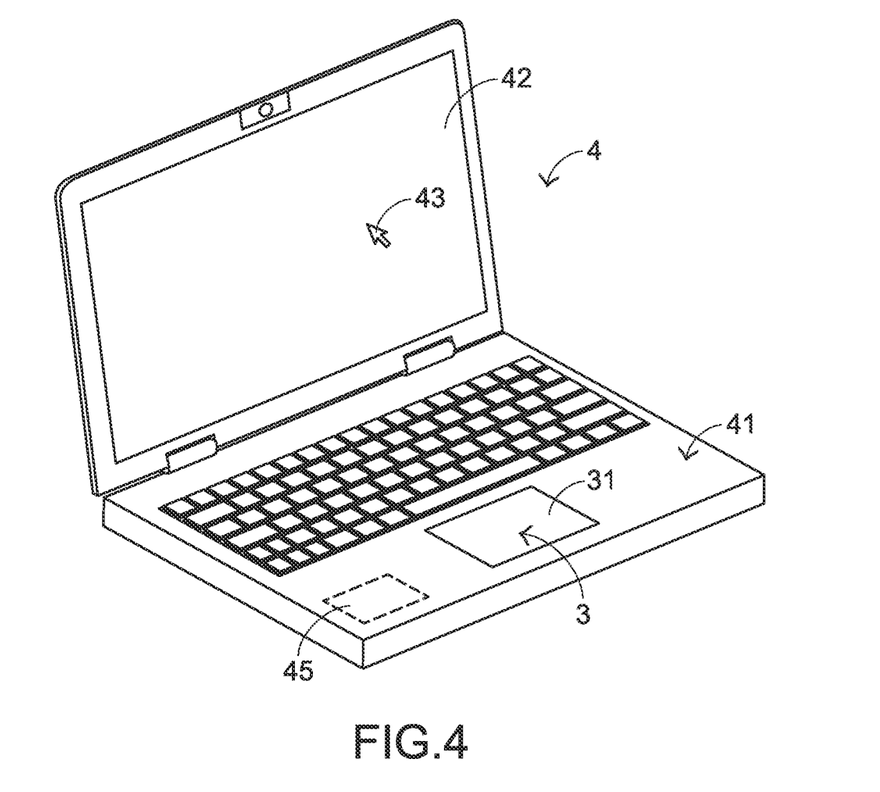
FIG. 4 is a schematic perspective view illustrating the outer appearance of an electronic computing device with a touch module according to an embodiment of the present invention.

FIG. 4 is a schematic perspective view illustrating the outer appearance of an electronic computing device with a touch module according to an embodiment of the present invention. An example of the electronic computing device 4 includes but is not limited to a notebook computer. In an embodiment, the electronic computing device 4 comprises a casing 41, a display screen 42, a processor 45 and a touch module 3. The processor 45 is disposed within the casing 41. Moreover, the processor 41 is used for processing electronic signals of the electronic computing device 4. Moreover, a fixing frame 44 is concavely formed in the casing 41 (see FIGS. 9 and 10). The touch module 3 is disposed within the fixing frame 44 and electrically connected with the processor 45. In addition, at least a portion of the touch module 3 is exposed outside so as to be touched by the user's finger. Consequently, the user may operate the touch module 3 to control the electronic computing device 4. For example, in case that the user's finger is placed on the touch module 3 and slid on the touch module 3, a cursor 43 shown on the display screen 42 is correspondingly moved. Moreover, in case that the touch module 3 is pressed by the user's finger, the electronic computing device 4 executes a specified function.

Figure 5:
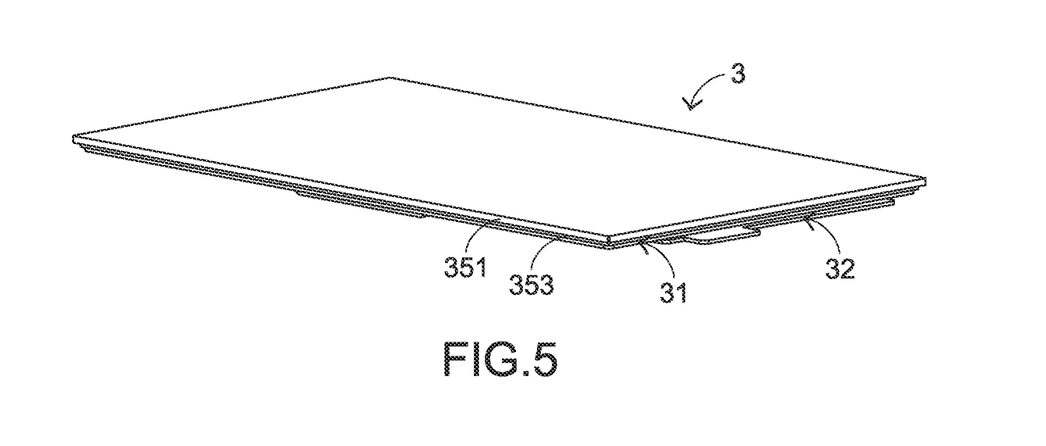
FIG. 5 is a schematic perspective view illustrating the structure of the touch module as shown in FIG. 4.
Figure 6:
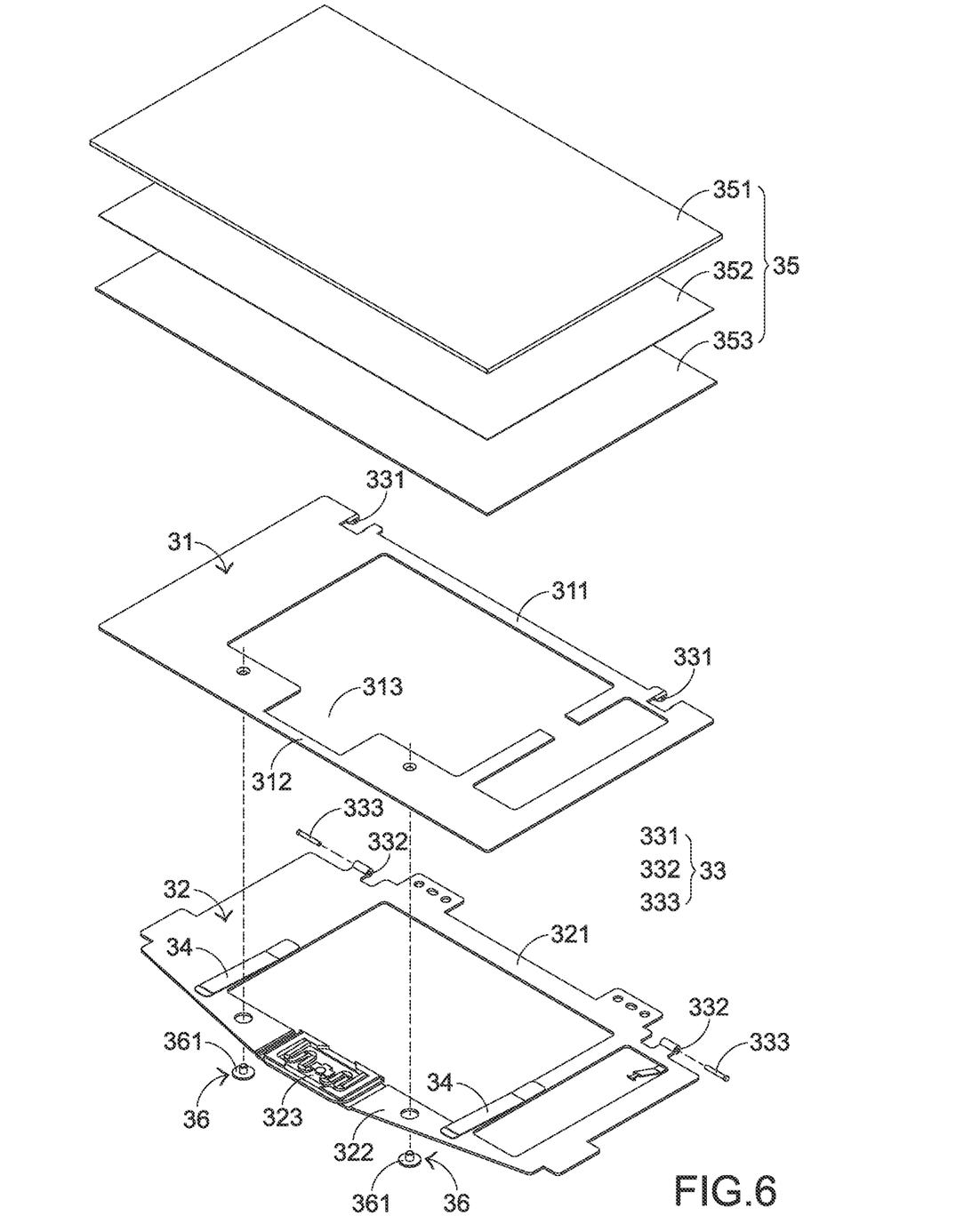
FIG. 6 is a schematic exploded view illustrating a portion of the touch module as shown in FIG. 5 and taken along a viewpoint.
Figure 7:
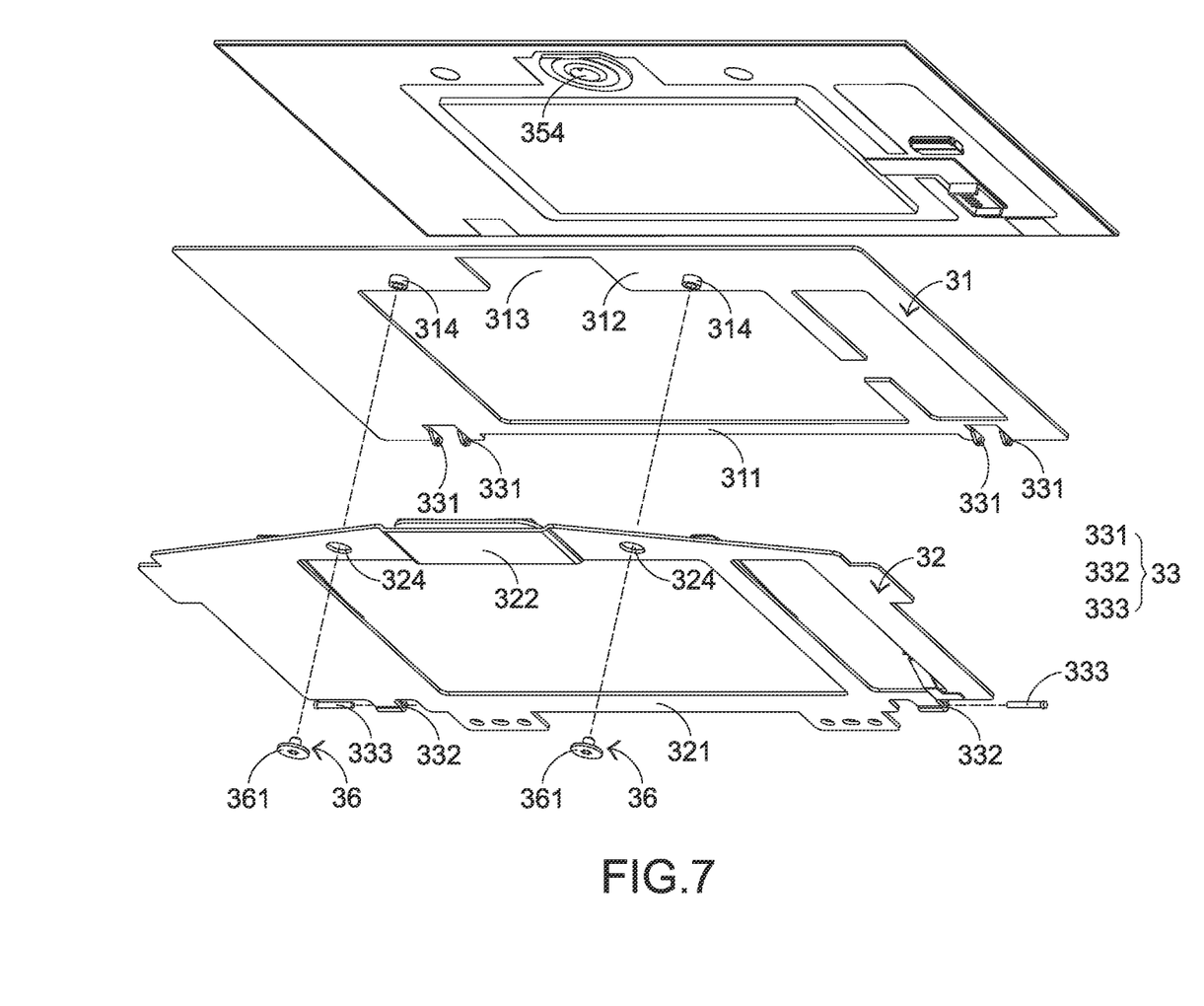
FIG. 7 is a schematic exploded view illustrating a portion of the touch module as shown in FIG. 5 and taken along another viewpoint.
Figure 8:
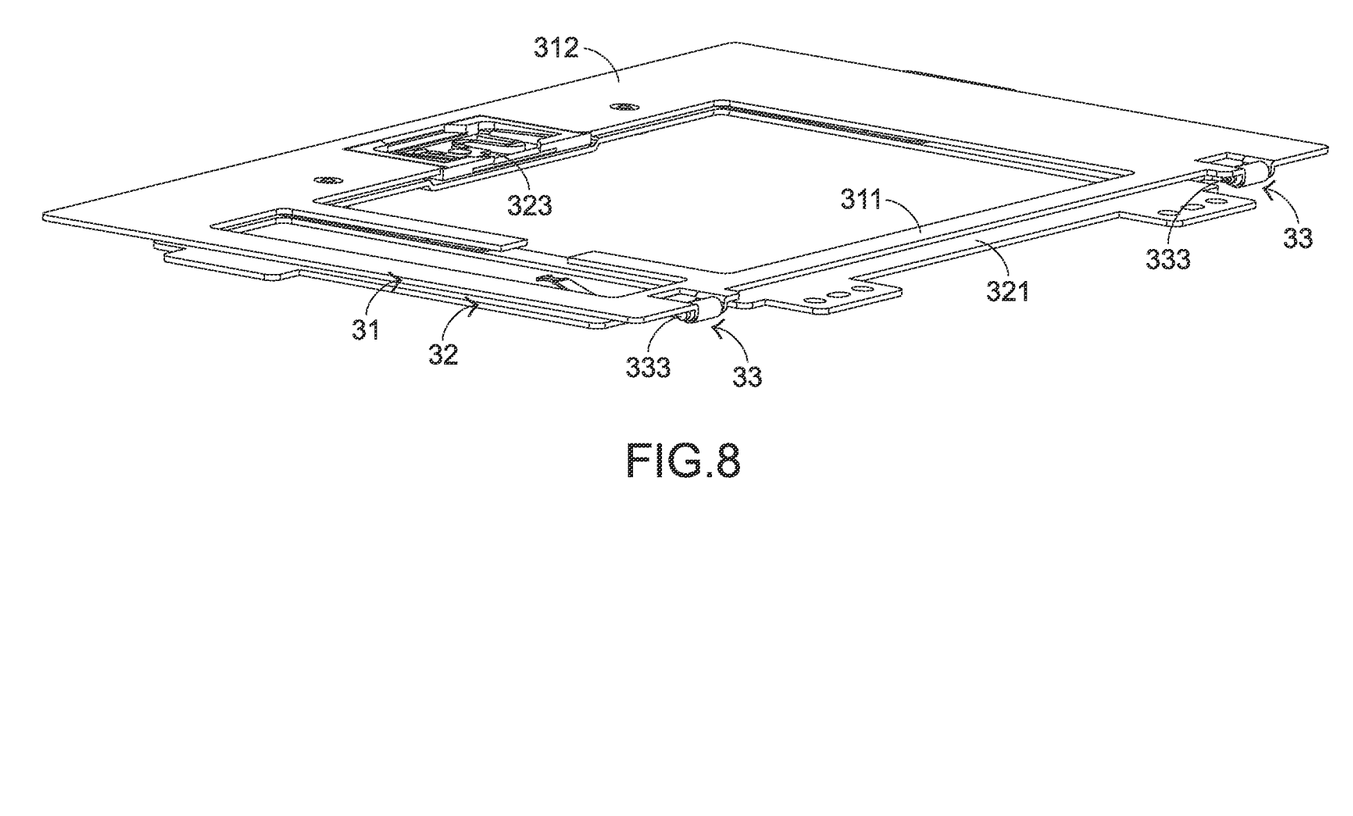
FIG. 8 is a schematic perspective view illustrating a portion of the touch module as shown in FIG. 5.

Please refer to FIGS. 5, 6, 7 and 8. FIG. 5 is a schematic perspective view illustrating the structure of the touch module as shown in FIG. 4. FIG. 6 is a schematic exploded view illustrating a portion of the touch module as shown in FIG. 5 and taken along a viewpoint. FIG. 7 is a schematic exploded view illustrating a portion of the touch module as shown in FIG. 5 and taken along another viewpoint. FIG. 8 is a schematic perspective view illustrating a portion of the touch module as shown in FIG. 5. The touch module 3 comprises an upper plate 31, a lower plate 32, a hinge structure 33, two elastomers 34 and a touchpad assembly 35. The lower plate 32 is separately located under the upper plate 31. The elastomers 34 are arranged between the upper plate 31 and the lower plate 32. The hinge structure 33 is arranged between a first end 311 of the upper plate 31 and a first end 321 of the lower plate 32. Moreover, the first end 311 of the upper plate 31 and the first end 321 of the lower plate 32 are pivotally coupled to each other through the hinge structure 33. Consequently, a second end 312 of the upper plate 31 may be swung relative to a second end 322 of the lower plate 32.

The touchpad assembly 35 is located over the upper plate 31. From top to bottom, the touchpad assembly 35 comprises a covering plate 351, an adhesive layer 352 and a circuit board 353. The covering plate 351 and the circuit board 353 are combined together through the adhesive layer 352. A switch element 354 is mounted on the circuit board 353. The switch element 354 is located under the touchpad assembly 35 and aligned with the second end 322 of the lower plate 32. A top surface of the covering plate 351 is exposed outside. Consequently, the covering plate 351 can be touched and operated by the user. When the circuit board 353 senses the touching and operating behavior of the user on the covering plate 351, the circuit board 353 issues a corresponding electronic signal. According to the electronic signal, the electronic computing device 4 executes a corresponding command. Preferably but not exclusively, the covering plate 351 is a glass covering plate or a plastic covering plate, and the adhesive layer 352 is made of a pressure sensitive adhesive (PSA).

In an embodiment, both of the upper plate 31 and the lower plate 32 are made of metallic materials such as iron. The upper plate 31 further comprises an upper plate opening 313. When the touchpad assembly 35 is placed over the upper plate 31, the switch element 354 is inserted in the upper plate opening 313.

The hinge structure 33 comprises two upper plate pivotal holes 331, two lower plate pivot holes 332 and two bolts 333. The upper plate pivotal holes 331 are located at the first end 311 of the upper plate 31. The lower plate pivot holes 332 are located at the first end 321 of the lower plate 32. The bolts 333 are penetrated through the corresponding upper plate pivotal holes 331 and the lower plate pivot holes 332. Consequently, the second end 312 of the upper plate 31 can be swung relative to the second end 322 of the lower plate 32.

It is noted that the material of the upper plate 31, the material of the lower plate 32, the position relation between the switch element 354 and the upper plate 31 and the constituents of the hinge structure 33 may be varied according to the practical requirements. For example, in another embodiment, the hinge structure 33 is not equipped with the bolts 333. In this case, the upper plate pivotal holes 331 are replaced with rotary shafts, and the rotary shafts are located at the first end 311 of the upper plate 31 and inserted into the corresponding lower plate pivot holes 332. Alternatively, the lower plate pivot holes 332 are replaced with rotary shafts, and the rotary shafts are located at the first end 321 of the lower plate 32 and inserted into the corresponding upper plate pivotal holes 331. Consequently, the second end 312 of the upper plate 31 can be swung relative to the second end 322 of the lower plate 32.

Figure 9:
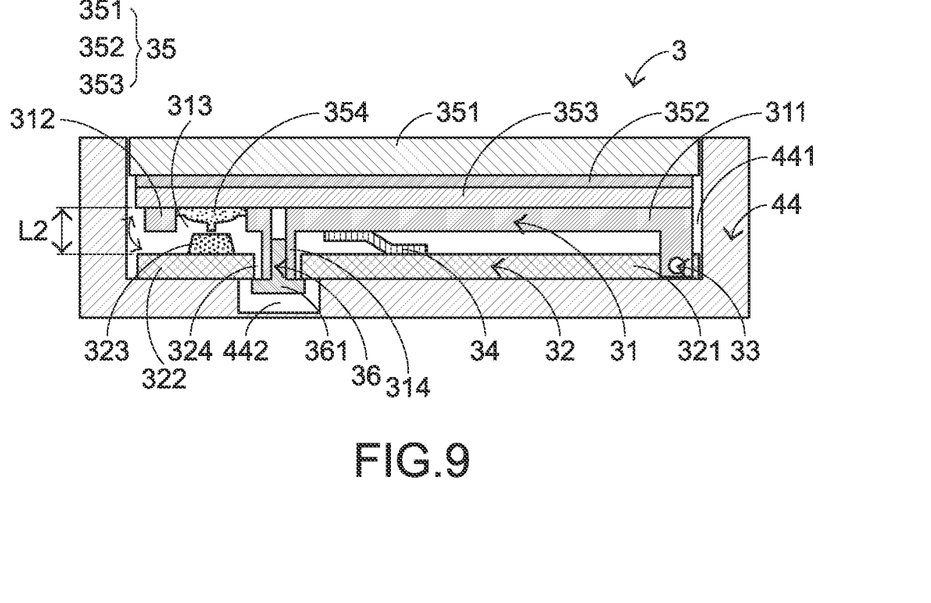
FIG. 9 is a schematic cross-sectional view illustrating portions of the fixing frame and the touch module of the electronic computing device as shown in FIG. 4.
Figure 10:
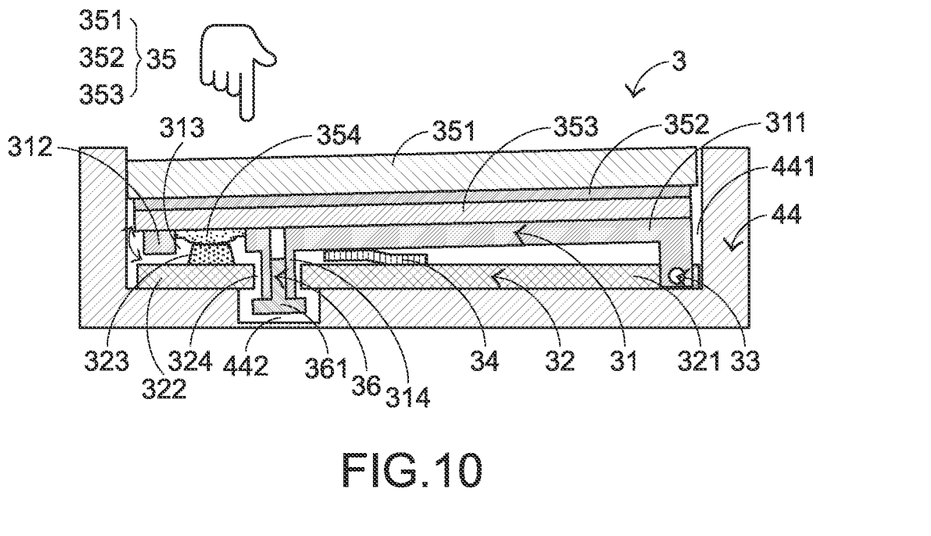
FIG. 10 is a schematic cross-sectional view illustrating the situation of pressing the touchpad assembly of the touch module as shown in FIG. 9.

Please refer to FIGS. 9 and 10. FIG. 9 is a schematic cross-sectional view illustrating portions of the fixing frame and the touch module of the electronic computing device as shown in FIG. 4. FIG. 10 is a schematic cross-sectional view illustrating the situation of pressing the touchpad assembly of the touch module as shown in FIG. 9. The fixing frame 44 of the electronic computing device 4 comprises an accommodation space 441. The touchpad assembly 35, the upper plate 31, the lower plate 32, the hinge structure 33 and the elastomers 34 of the touch module 3 are accommodated within the accommodation space 441. In an embodiment, the lower plate 32 further comprises an elastic part 323. The elastic part 323 is disposed on the second end 322 of the lower plate 32 and aligned with the switch element 354.

While the covering plate 351 of the touchpad assembly 35 is pressed down, the upper plate 31 is moved with the touchpad assembly 35. Consequently, the second end 312 of the upper plate 31 is swung downwardly relative to the second end 322 of the lower plate 32. Moreover, since the switch element 354 is pushed by the elastic part 323 of the lower plate 32, the switch element 354 is triggered. When the touchpad assembly 35 is no longer pressed, the elastomers 34 between the upper plate 31 and the lower plate 32 provide elastic forces to the upper plate 31. Consequently, the second end 312 of the upper plate 31 is swung upwardly relative to the second end 322 of the lower plate 32. As the upper plate 31 is swung upwardly, the touchpad assembly 35 is returned to its original position. The principles of triggering the switch element 354 of the touchpad assembly 35 are well known to those skilled in the art, and are not redundantly described herein.

In this embodiment, the touch module 3 further comprises a positioning element 36. Moreover, the upper plate 31 further comprises at least one upper plate positioning part 314. The upper plate positioning part 314 is protruded downwardly from the upper plate 31. The positioning element 36 is inserted into and engaged with the upper plate positioning part 314 of the upper plate 31. Consequently, the positioning element 36 is swung with the upper plate 31. The lower plate 32 further comprises a lower plate perforation 324 corresponding to the upper plate positioning part 314. The positioning element 36 further comprises a positioning contact part 361. The positioning contact part 361 is protruded from an outer periphery of the positioning element 36. The outer diameter of the positioning contact part 361 is larger than the outer diameter of the lower plate perforation 324. Consequently, while the positioning element 36 is penetrated through the lower plate perforation 324 of the lower plate 32 and the positioning element 36 is inserted into and engaged with the upper plate positioning part 314 of the upper plate 31, the positioning element 36 is correspondingly moved in response to the elastic force provided from the elastomer 34 to the upper plate 31. The positioning element 36 is moved until the positioning contact part 361 of the positioning element 36 is contacted with a bottom surface of the lower plate 32.

The fixing frame 44 of the electronic computing device 4 further comprises a recess 422. The recess 442 is extended downwardly from the accommodation space 441. While the covering plate 351 of the touchpad assembly 35 is pressed down, the upper plate positioning part 314 of the upper plate 31 and the positioning element 36 coupled with the upper plate positioning part 314 are received within the space of the recess 422.

The arrangements of the positioning element 36, the upper plate positioning part 314 and the lower plate perforation 324 provide the following benefits. The depth of the coupling junction between the positioning element 36 and the upper plate positioning part 314 may be properly adjusted. Consequently, in case that the touchpad assembly 35 is not pressed down, the distance L2 between the upper plate 31 and the lower plate 32 is kept constant (see FIG. 9). That is, if the touchpad assembly 35 is not pressed down, the position of the touchpad assembly 35 is fixed. Under this circumstance, the touchpad assembly 35 is not ascended above the fixing frame 44 or descended below the fixing frame 44, or the touchpad assembly 35 is not inclined. That is, the touchpad assembly 35 is maintained in the horizontal status.

In an embodiment, the upper plate positioning part 314 of the upper plate 31 is a positioning part with a positioning screw hole, and the positioning element 36 is a positioning element with a positioning thread structure (not shown). The depth of the coupling junction between the positioning element 36 and the upper plate positioning part 314 is adjustable through the positioning screw hole and the positioning thread structure. Consequently, the distance L2 between the upper plate 31 and the lower plate 32 can be kept constant. The examples of the positioning element 36 and the upper plate positioning part 314 are presented herein for purpose of illustration and description only. It is noted that numerous modifications and alterations may be made while retaining the teachings of the invention. For example, in another embodiment, the upper plate positioning part 314 of the upper plate 31 is a positioning part with a positioning thread structure (not shown), and the positioning element 36 is a positioning element with a positioning screw hole. Similarly, the depth of the coupling junction between the positioning element 36 and the upper plate positioning part 314 is adjustable through the positioning screw hole and the positioning thread structure. Consequently, the distance L2 between the upper plate 31 and the lower plate 32 can be kept constant.

Figure 11:
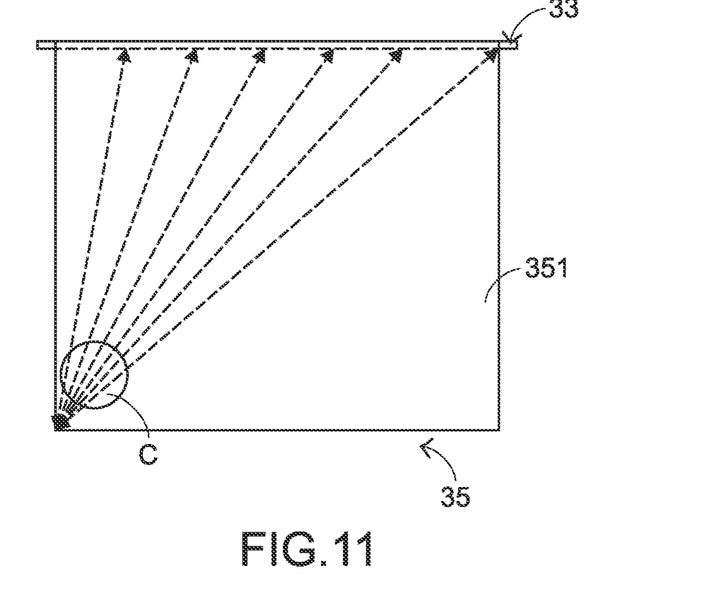
FIG. 11 schematically illustrates the stress/tensile strength distribution of pressing down a corner of the touch module according to the embodiment of the present invention.
Figure 12:
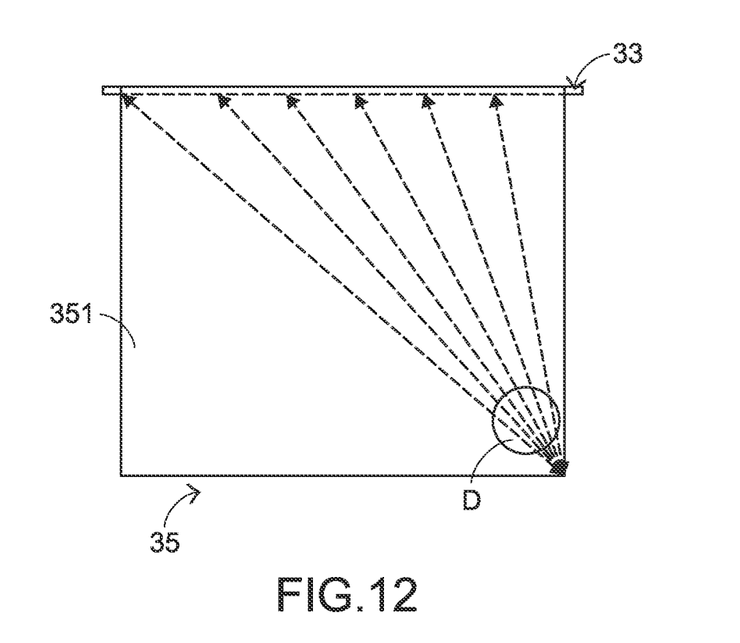
FIG. 12 schematically illustrates the stress/tensile strength distribution of pressing down another corner of the touch module according to the embodiment of the present invention.

Please refer to FIGS. 11 and 12. FIG. 11 schematically illustrates the stress/tensile strength distribution of pressing down a corner of the touch module according to the embodiment of the present invention. FIG. 12 schematically illustrates the stress/tensile strength distribution of pressing down another corner of the touch module according to the embodiment of the present invention. The region C as shown in FIG. 11 and the region D as shown in FIG. 12 denote two corners on the covering plate 351 of the touchpad assembly 35. That is, the regions C and D are respectively aligned with two opposite sides of the second end 312 of the upper plate 31. The dotted lines of FIG. 11 denote the stress/tensile strength distribution when the corner C of the touch module 3 is pressed down. The dotted lines of FIG. 12 denote the stress/tensile strength distribution when the corner D of the touch module 3 is pressed down. As shown in FIGS. 11 and 12, the touch module 3 is equipped with the hinge structure 33. When one of the region C and the region D is pressed down, the downward displacement of the region C and the downward displacement of the region D are substantially equal.

From the above descriptions, the touch module 3 of the present invention is a modularized device. It is not necessary to install associated restoring components in the fixing frame 44 of the electronic computing device 4 to return the touchpad assembly 35 after the touchpad assembly 35 is no longer pressed down. Moreover, it is not necessary to install associated positioning element in the fixing frame 44 of the electronic computing device 4 to prevent the touchpad assembly 35 from being ascended above the fixing frame 44 or descended below the fixing frame 44 or prevent the touchpad assembly 35 from being inclined (or in the non-horizontal status). During the process of assembling the touch module 3 with the electronic computing device 4, only the following steps are needed. That is, the depth of the coupling junction between the positioning element 36 and the upper plate positioning part 314 of the touch module 3 is adjusted, and the control module 3 is placed into and electrically connected with the fixing frame 44 of the casing 4 of the positioning element 36. Consequently, the installing convenience and the positioning reliability of the touchpad assembly 35 are largely enhanced.

Figure 13:
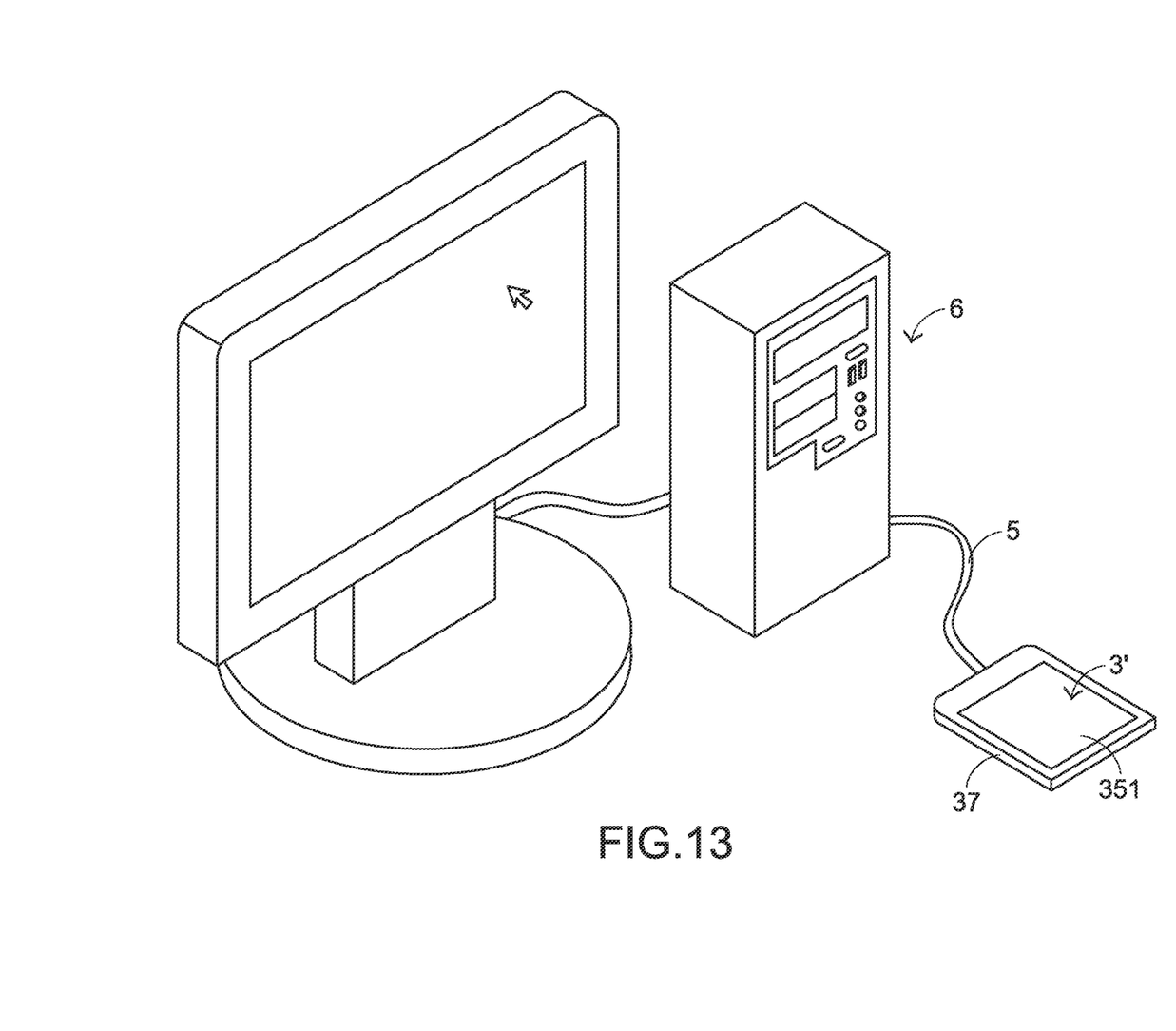
FIG. 13 schematically illustrates a touch module for an electronic computing device according to another embodiment of the present invention.
Figure 14:
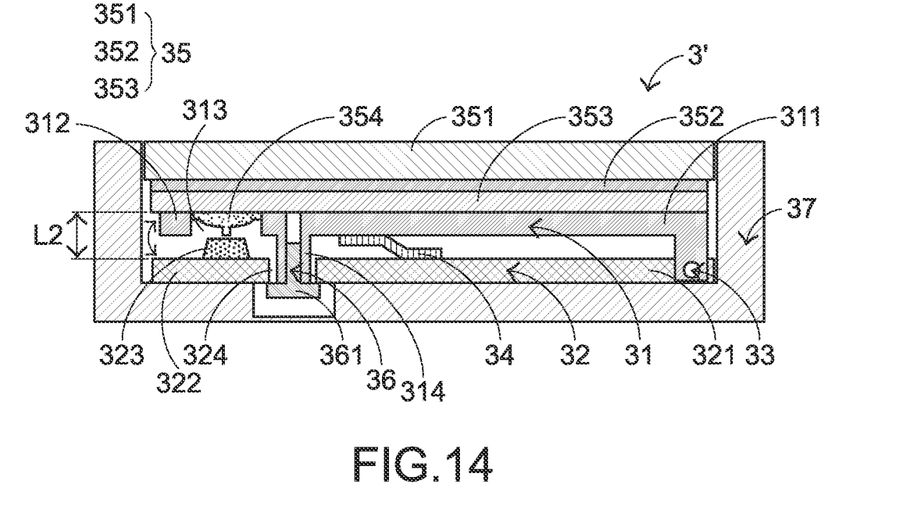
FIG. 14 is a schematic cross-sectional view illustrating a portion of the touch module as shown in FIG. 13.

It is noted that numerous modifications and alterations may be made while retaining the teachings of the invention. For example, in another embodiment, the touch module is an external input device that is independent from the electronic computing device. Please refer to FIGS. 13 and 14. FIG. 13 schematically illustrates a touch module for an electronic computing device according to another embodiment of the present invention. FIG. 14 is a schematic cross-sectional view illustrating a portion of the touch module as shown in FIG. 13. The structures and functions of the components of the touch module 3' which are identical to those of the above embodiment are not redundantly described herein. In comparison with the above embodiment, the touch module 3' further comprises a fixing frame 37. The touchpad assembly 35, the upper plate 31, the lower plate 32, the hinge structure 33 and the elastomers 34 are accommodated within the fixing frame 37. The touch module 3' is in communication with a desktop computer 6 through a universal serial bus (USB) 5.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A touch module, comprising:
    an upper plate;
    a lower plate separately located under the upper plate;
    a hinge structure arranged between a first end of the upper plate and a first end of the lower plate, wherein the first end of the upper plate and the first end of the lower plate are pivotally coupled to each other through the hinge structure, so that a second end of the upper plate is permitted to be swung relative to a second end of the lower plate;
    an elastomer arranged between the upper plate and the lower plate; and a touchpad assembly located over the upper plate, wherein a switch element is located under the touchpad assembly and aligned with the second end of the lower plate, wherein while the touchpad assembly is pressed down and the upper plate is moved with the touchpad assembly, the second end of the upper plate is swung downwardly relative to the second end of the lower plate and the switch element is triggered, wherein when the touchpad assembly is no longer pressed, the elastomer provides an elastic force to the upper plate, wherein in response to the elastic force, the second end of the upper plate is swung upwardly relative to the second end of the lower plate and the touchpad assembly is returned to an original position, wherein an upper plate positioning part is protruded downwardly from the upper plate, the lower plate further comprises a lower plate perforation corresponding to the upper plate positioning part, and the touch module further comprises a positioning element, wherein the positioning element comprises a positioning contact part that is protruded from an outer periphery of the positioning element, and an outer diameter of the positioning contact part is larger than an outer diameter of the lower plate perforation, wherein while the positioning element is penetrated through the lower plate perforation and inserted upwardly into the upper plate positioning part, the positioning contact part is contacted with a bottom surface of the lower plate in response to the elastic force of the elastomer provided to the upper plate.

2. The touch module according to claim 1, wherein the hinge structure comprises an upper plate pivotal hole, a lower plate pivot hole and a bolt, wherein the bolt is penetrated through the upper plate pivotal hole and the lower plate pivot hole, the upper plate pivotal hole is located at the first end of the upper plate, and the lower plate pivot hole is located at the first end of the lower plate.

3. The touch module according to claim 1, wherein one of the upper plate positioning part of the upper plate comprises a positioning screw hole, and the other of the upper plate positioning part of the upper plate comprises a positioning thread structure.

4. The touch module according to claim 1, wherein while the touchpad assembly is pressed down, the upper plate positioning part and the positioning element coupled with the upper plate positioning part are received within a recess of a fixing frame, wherein the fixing frame further comprises an accommodation space, wherein the upper plate, the lower plate, the hinge structure, the elastomer, the touchpad assembly and the positioning element are accommodated within the accommodation space, and the recess is extended downwardly from the accommodation space.

5. The touch module according to claim 4, wherein the fixing frame is included in an electronic computing device, or the touch module further comprises the fixing frame.

6. The touch module according to claim 1, wherein the upper plate is made of metallic material, and/or the lower plate is made of metallic material.

7. The touch module according to claim 1, wherein the touchpad assembly comprises a covering plate, an adhesive layer and a circuit board, wherein the circuit board is located over the upper plate, and the covering plate and the circuit board are combined together through the adhesive layer, wherein the switch element is mounted on the circuit board.

8. The touch module according to claim 7, wherein the covering plate is a glass covering plate or a plastic covering plate, and/or the adhesive layer is made of a pressure sensitive adhesive (PSA).

9. The touch module according to claim 1, wherein the lower plate further comprises an elastic part corresponding to the switch element, wherein when the touchpad assembly is pressed down, the switch element is pushed by the elastic part, so that the switch element is triggered.

10. The touch module according to claim 9, wherein the upper plate further comprises an upper plate opening, wherein when the touchpad assembly is placed over the upper plate, the switch element is inserted in the upper plate opening.

11. An electronic computing device, comprising:
a casing, wherein a fixing frame is concavely formed in the casing;
a processor disposed within the casing; and
a touch module disposed within the fixing frame and electrically connected with the processor, wherein the touch module comprises:
an upper plate;
a lower plate separately located under the upper plate;
a hinge structure arranged between a first end of the upper plate and a first end of the lower plate, wherein the first end of the upper plate and the first end of the lower plate are pivotally coupled to each other through the hinge structure, so that a second end of the upper plate is permitted to be swung relative to a second end of the lower plate;
an elastomer arranged between the upper plate and the lower plate; and
a touchpad assembly located over the upper plate, wherein a switch element is located under the touchpad assembly and aligned with the second end of the lower plate, wherein while the touchpad assembly is pressed down and the upper plate is moved with the touchpad assembly, the second end of the upper plate is swung downwardly relative to the second end of the lower plate and the switch element is triggered, wherein when the touchpad assembly is no longer pressed, the elastomer provides an elastic force to the upper plate, wherein in response to the elastic force, the second end of the upper plate is swung upwardly relative to the second end of the lower plate and the touchpad assembly is returned to an original position, wherein an upper plate positioning part is protruded downwardly from the upper plate, the lower plate further comprises a lower plate perforation corresponding to the upper plate positioning part, and the touch module further comprises a positioning element, wherein the positioning element comprises a positioning contact part that is protruded from an outer periphery of the positioning element, and an outer diameter of the positioning contact part is larger than an outer diameter of the lower plate perforation, wherein while the positioning element is penetrated through the lower plate perforation and inserted upwardly into the upper plate positioning art, the positioning contact part is contacted with a bottom surface of the lower plate in response to the elastic force of the elastomer provided to the upper plate.

12. The electronic computing device according to claim 11, wherein the hinge structure comprises an upper plate pivotal hole, a lower plate pivot hole and a bolt, wherein the bolt is penetrated through the upper plate pivotal hole and the lower plate pivot hole, the upper plate pivotal hole is located at the first end of the upper plate, and the lower plate pivot hole is located at the first end of the lower plate.

13. The electronic computing device according to claim 11, wherein one of the upper plate positioning part of the upper plate comprises a positioning screw hole, and the other of the upper plate positioning part of the upper plate comprises a positioning thread structure.

14. The electronic computing device according to claim 11, wherein the fixing frame comprises an accommodation space and a recess, wherein the touch module is accommodated within the accommodation space, and the recess is extended downwardly from the accommodation space, wherein while the touchpad assembly is pressed down, the upper plate positioning part and the positioning element coupled with the upper plate positioning part are received within the recess.

15. The electronic computing device according to claim 11, wherein the upper plate is made of metallic material, and/or the lower plate is made of metallic material.

16. The electronic computing device according to claim 11, wherein the touchpad assembly comprises a covering plate, an adhesive layer and a circuit board, wherein the circuit board is located over the upper plate, and the covering plate and the circuit board are combined together through the adhesive layer, wherein the switch element is mounted on the circuit board.

17. The electronic computing device according to claim 11, wherein the lower plate further comprises an elastic part corresponding to the switch element, wherein when the touchpad assembly is pressed down, the switch element is pushed by the elastic part, so that the switch element is triggered.

18. The electronic computing device according to claim 17, wherein the upper plate further comprises an upper plate opening, wherein when the touchpad assembly is placed over the upper plate, the switch element is inserted in the upper plate opening.

* * * * *